Nov. 26, 1935.  R. FELDTKELLER  2,022,496
AMPLIFIER
Filed Aug. 23, 1932
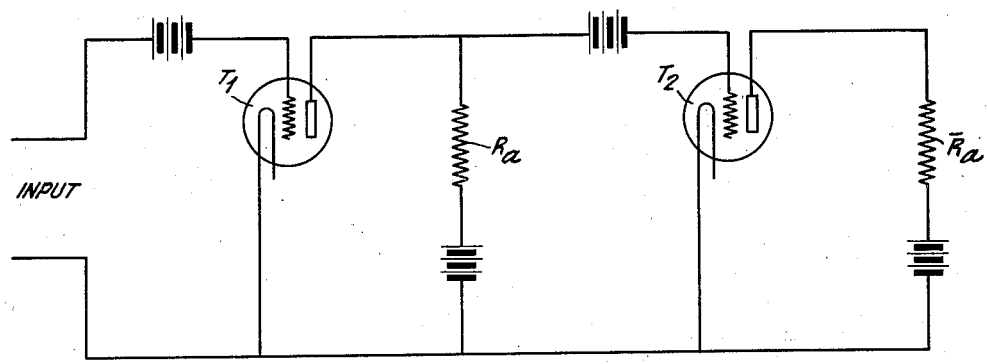
INVENTOR
RICHARD FELDTKELLER
BY
ATTORNEY Patented Nov. 26, 1935

2,022,496

UNITED STATES PATENT OFFICE 2,022,496

AMPLIFIER

Richard Feldtkeller, Berlin-Siemensstadt, Germany, assignor to Siemens & Halske Aktiengesellschaft, Siemensstadt, near Berlin, Germany, a corporation of Germany Application August 23, 1932, Serial No. 630,027
In Germany August 24, 1931

1 Claim. (Cl. 179—171)

The present invention relates broadly to amplifier circuits and the like and more particularly to circuit arrangements for substantially eliminating the effects of distortion.

The invention is predicated upon the fact that non-linear distortions caused by curvatures or knees in the characteristic curves of tubes, etc. may be compensated by that potentials fed to or impressed upon the system having a curved characteristic are priorly distorted in such a way that the two distortions will just neutralize or offset each other, such intentionally caused distortion being insured, for instance, by the use of a system whose characteristic is the reflected image of the characteristic of the system wherein distortion is to be corrected. It has been ascertained that the non-linearities of two consecutive resistance coupled amplifier tubes are more or less compensated. This phenomenon is predicated upon this circumstance that the grid alternating potentials of the two tubes present a phase displacement angle of 180 degrees. However, the compensation observed in resistance coupled tubes is not perfect; indeed, perfect compensation presupposes not only a phase difference of 180 degrees between the two grid potentials and as close as feasible a likeness in the curve-shape, but it is predicated also upon the fulfillment of certain requirements as regards the position of the working point, the degree of modulation, etc.

The present invention discloses a rule and law on the basis of which two tubes and their coupling means can be so proportioned that practically complete compensation is secured. The elimination of or correction of non-linear distortion according to this invention, fundamentally speaking, may be effected between any pair of tubes of an amplifier even if they do not follow each other immediately. In practice, however, preferably and primarily two consecutive tubes are used, indeed, in this instance preferably a power tube and the corresponding tube preceding the same for the purpose of compensating non-linear distortions. In general, such preceding stages of an amplifier assembly are so dimensioned that they are practically free from non-linear distortions. The degree of modulation of these stages is made correspondingly lower. However, in the case of end or power tubes which are called upon to deliver large volumes of energy, for reasons of high economy and efficiency, there arises the desirability of pushing the modulation thereof to an extreme. The economy of an amplifier arrangement therefore is enhanced if the preceding tube and the coupling means thereof are so dimensioned that such non-linearities as are occasioned owing to extensive modulation of the power tube will be neutralized.

Because of the importance to be attached to the basic idea of this invention, particularly in reference to the modulation of the power tubes the suppositions chosen for the following examination are such that they will mostly be fulfilled by power or end-stage tubes and the respective stages preceding them.

According to the invention the ratio of adaptation of the preceding tube, i. e., the quotient of outer resistance of the plate and the inner resistance of the tube is so chosen that it will be smaller than, or at most equal to, the adaptation ratio of the power tube.

By a circuit scheme according to the invention it is primarily the second harmonic which under conditions as here considered is practically the only wave causing trouble, that is eliminated. What is presupposed is that the characteristics of the two tubes obey approximately the same mathematical law, say, $J = G \cdot E_\gamma$, and that the region of the upper knee of the characteristic lies outside the range of modulation. The further assumption is made that the power tube is first overmodulated.

In what follows the basic idea of the invention is explained and argued in more detail. Such denotations and symbols as are used in the following investigation for tube constants, currents, voltages, etc. are characterized by overscoring whenever they relate to the power tube.

The dimensions of the adaptation ratio of the power tube may be regarded as fixed; generally speaking, it is chosen with due regard for maximum power delivery, while at the same time a prescribed frequency independence is preserved. Hence, there is known (1) $$\bar{r}_a = \frac{\bar{R}_a}{\bar{R}_i}$$

where $\bar{R}_a$ a real load resistance independent of the frequency, and $\bar{R}_i$ the internal resistance. The "Klirrfactor" or blur factor of the power tube which is proportional to the alternating current amplitude $\bar{J}_\omega$ shall be denoted by $\bar{k}_E$ when the power tube is fully modulated. Now, let the first tube be one-half modulated when the power tube is fully modulated. Optimum compensation of non-linear distortions is obtained when the said blur factor of the preceding tube, in the presence of modulation λ, is equal to the blur factor of the power tube, in the presence of complete modulation, in other words when (2) $$k_\lambda = \bar{k}_E$$

If both characteristics, for instance, obey this law:

(3) $$J_a = G(DE_a + E_g)^\gamma$$

where $J_a$ is the plate current, $E_a$ the plate potential $E_g$ the grid potential, $D$ the gain-reciprocal $(1:\mu)$, and $G$ and $\gamma$ constants, then the blur factor will be (4) $$k = \frac{\gamma-1}{4\gamma} \cdot \frac{J_\omega}{J_a} \cdot \frac{1}{1+r_a}$$

Between the plate alternating current amplitude $\bar{J}_\omega$ and the grid alternating voltage amplitude $\bar{U}_g$ there prevails this relationship (5) $$\bar{J}_\omega = \frac{\bar{U}_g}{\bar{D}\bar{R}_i} \cdot \frac{1}{1+\bar{r}_a}$$

If $\ddot{u}$ is the ratio of transformation of an ideal interstage transformer between the preceding (input) and the power tube, and $R_a$ the ohmic load resistance of the preceding tube, then the grid alternating potential $\bar{U}_g$ of the power tube, if the grid alternating potential applied to the preceding tube is $U_g$, must be calculated by this equation (6) $$\frac{\bar{U}_g}{U_g} = \frac{R_a}{R_i + R_a} \cdot \ddot{u}$$

What results is (7) $$\bar{U}_g = \frac{U_g}{D} \cdot \frac{r_a}{1+r_a} \cdot \ddot{u}$$

Hence, the plate alternating current of the power tube $\bar{J}$ thus becomes:

(8) $$\bar{J}_\omega = \frac{U_g}{D} \cdot \frac{1}{\bar{D}\cdot\bar{R}_i} \cdot \frac{r_a}{1+r_a} \cdot \frac{1}{1+\bar{r}_a} \cdot \ddot{u}$$

The blur factor is then expressible thus:

(9) $$\bar{k} = \frac{\bar{\gamma}-1}{4\bar{\gamma}} \cdot \frac{1}{J_a \bar{D}\bar{R}_i} \cdot \frac{U_g}{D} \cdot \frac{r_a}{1+r_a} \cdot \frac{1}{(1+\bar{r}_a)^2} \cdot \ddot{u}$$

And the blur factor of the preceding tube thus becomes:

(10) $$k = \frac{\gamma-1}{4\gamma} \cdot \frac{U_g}{J_a \cdot D \cdot R_i} \cdot \frac{1}{(1+r_a)^2}$$

Therefore, the blur factors of both tubes become equal to each other if Equation (9) above equals Equation (10) above.

(11) $$\frac{\bar{\gamma}-1}{4\bar{\gamma}} \cdot \frac{1}{J_a \bar{R}_1} \cdot \frac{\ddot{u}}{D} \cdot \frac{r_a}{(1+r_a)} \cdot \frac{1}{(1+\bar{r}_a)^2} = \frac{\gamma-1}{4\gamma} \cdot \frac{1}{J_a R_i} \cdot \frac{1}{(1+r_a)^2}$$

In the light of the above presupposition that the characteristics of both tubes obey the law laid down in Equation (3), there is $\gamma = \bar{\gamma}$.

From the theories of linear characteristics it is known that for an adaptation ratio $r_a$ the plate feed current must be adjusted to the value

(12) $$J_a = \frac{1}{2+r_a} \cdot \frac{B_a}{R_i}$$

in order that the working point may be positioned roughly in the middle of the straight portion of the characteristic. This law is approximately admissible also for characteristic fields where $$\gamma = \frac{3}{2}.$$

$B_a$ denotes the battery potential. From Equations (11) and (12) there follows:

(13) $$\frac{1}{\bar{B}_a} \cdot \frac{1}{D} \cdot \frac{r_a}{1+r_a} \cdot \frac{2+r_a}{(1+r_a)^2} \cdot \ddot{u} = \frac{1}{B_a} \cdot \frac{2+r_a}{(1+r_a)^2}$$

As has already been pointed out the adaptation ratio $r_a$ of the power tube is fixed. For instance, in order to preclude reflections it is chosen equal to $\bar{r}_a = 1$ in the case of power amplifiers. Equation (13) must then be regarded as one of the formulæ to define the adaptation ratio $r_a$ of the preceding tube and the transformation ratio $\ddot{u}$ of the interstage transformer. By conversion we get from Equation (13)

(14) $$\frac{r_a(1+r_a)}{(2+r_a)} \cdot \ddot{u} = \frac{\bar{B}_a}{B_a} \cdot D \cdot \frac{(1+\bar{r}_a)^2}{(2+\bar{r}_a)}$$

In the case of complete modulation of the power tube, i. e., when

(15) $$\bar{J}_\omega = \bar{J}_a$$

the preceding tube shall be assumed to be modulated only to the λth part, in other words, at that point the condition shall be fulfilled,

(16) $$J_\omega = \lambda J_a$$

where $\lambda \leqq 1$. Inasmuch as $J_\omega$ and $\bar{J}_\omega$, the plate alternating currents of both tubes are proportional to each other, this condition must always be fulfilled:

(17) $$\frac{J_\omega}{J_a} = \frac{\bar{J}_\omega}{\bar{J}_a} \cdot \lambda$$

Now, from Equation (5), if

(18) $$\bar{U}_g = J_\omega \cdot R_a \cdot \ddot{u}$$

there follows

(19) $$\bar{J}_\omega = \frac{J_\omega \cdot R_a \cdot \ddot{u}}{\bar{D} \cdot \bar{R}_i} \cdot \frac{1}{1+\bar{r}_a}$$

Hence, in accordance with Equation (17) there is

(20) $$\frac{J_\omega}{J_a} = \frac{J_\omega R_a \ddot{u}}{\bar{J}_a \bar{D} \bar{R}_i} \cdot \lambda \cdot \frac{1}{1+\bar{r}_a}$$

or

(21) $$\frac{1}{J_a} = \frac{1}{\bar{J}_a} \cdot \lambda \cdot \frac{R_a \ddot{u}}{\bar{D}\bar{R}_i} \cdot \frac{1}{1+\bar{r}_a}$$

and in the light of Equation (12)

(22) $$\frac{(2+r_a)R_i}{B_a} = \frac{(2+\bar{r}_a)\bar{R}_i}{\bar{B}_a} \cdot \lambda \cdot \frac{R_a \ddot{u}}{\bar{D}\bar{R}_i} \cdot \frac{1}{1+\bar{r}_a}$$

Consequently, there results

(23) $$\frac{2+r_a}{r_a \ddot{u}} = \frac{B_a}{\bar{B}_a} \cdot \lambda \cdot \frac{1}{D} \cdot \frac{2+\bar{r}_a}{1+\bar{r}_a}$$

this being the second formula defining $r_a$ and $\ddot{u}$. Eliminating from Equations (14) and (23) the transformation ratio $\ddot{u}$ there results after a number of transformations

(24) $$(1+r_a) = \lambda \cdot (1+\bar{r}_a)$$

In other words, if in the case of a power stage tube and the preceding tube the latter is modulated only to the λth part while the power tube is fully modulated, the adaptation ratio is so chosen for the preceding tube that it obeys Equation (24), i. e., if the said ratio of the preceding tube is chosen less than, or at most equal to, that of the power tube, then the blur factors of both tubes will be alike, and as a consequence there is insured a practically adequate compensation of the non-linearities of the two tubes.

In the preceding equations the blur factors of the two tubes have been made equal to each other in the case where the power tube is fully modulated (where thus $\bar{J}\omega = \bar{J}_a$); but since the blur factor is proportional to the alternating current amplitude $J\omega$ the blur factors will be equal to each other also in the presence of modulation of the two tubes different from what has been above considered. Hence, no matter what the amplitude of the alternating current there is insured compensation of the non-linear distortions of both tubes.

For the transformation ratio $\bar{u}$ one obtains from Equation (23)

$$(25) \quad \bar{u} = \frac{\lambda(1+\bar{r}_a)+1}{\lambda(1+\bar{r}_a)-1} \cdot \frac{1+\bar{r}_a}{2+\bar{r}_a} \cdot \frac{1}{\lambda} \cdot \frac{\bar{B}_a}{B_a} \cdot \bar{D}$$

So far as the selection of the internal resistance $R_i$ of the preceding tube is concerned the maximum frequency $\omega_n$ which is to be amplified without distortion will be decisive and governing. The internal resistance should be so chosen that in the presence of this frequency the aggregation of the capacities C interposed between the grid and the filament of the power tube will not constitute any essential shunt. This will actually be so when $$(26) \quad \frac{1}{C \cdot \omega_n \cdot \bar{u}^2} \geq \frac{R_a R_i}{R_a + R_i} = R_i \cdot \frac{r_a}{1+r_a}$$

Whence there follows:

$$(27) \quad R_i \leq \frac{1+r_a}{r_a} \cdot \frac{1}{C \cdot \omega_n \cdot \bar{u}^2}$$

On this basis the preceding tube should be selected. Then also the plate resistance of the preceding tube $R_a$ is determined from $R_i$ and $r_a$.

The invention is based upon the presupposition that the grid alternating potentials of both tubes present a phase displacement angle or difference of 180 degrees in reference to each other. This is readily true of resistance-coupled tubes, while for transformer coupled arrangements this condition is easily insurable by suitable poling of the transformer.

In the drawing, the single figure represents in diagrammatic form a preferred embodiment of the invention.

While the foregoing is believed to be a complete analysis of the invention it may be well to add a quantitative description for the purpose of visualizing the invention more readily. In this quantitative description it will be supposed that tube $T_2$ is an output tube working into a load resistance $\bar{R}_a$. In order to get maximum power output from this tube the load resistance must be chosen to be approximately equal to the internal tube resistance $\bar{R}_i$ and the grid excitation should be sufficient to swing the plate current from zero to substantially saturation.

Under these conditions a very considerable proportion of second harmonic current will be developed in the load circuit due to non-linearity of the tube characteristic. According to the invention the preceding tube $T_1$ is resistance coupled to the output tube and a certain amount of second harmonics or double frequency current will be developed in tube $T_1$ which, flowing through the coupling resistance $R_a$, produces on the grid of tube $T_2$ a voltage of twice the signal frequency and of such phase as to tend to create through the amplifying action of the output tube a distortion or second harmonic current in load $\bar{R}_a$ which is in opposite phase to the distortion or second harmonic arising as first explained out of the non-linearity of the output tube itself. Thus there appears the possibility of neutralizing the distortion current originating in the output tube by means of the distortion current originating in the preceding tube.

But it has been found that satisfactory compensation does not take place when the preceding tube is coupled to the output tube by means of a resistance of the usual value which is high relative to the internal resistance $R_i$ of tube $T_1$. This is for the reason that tube $T_1$ is ordinarily and preferably of such size that the voltage input to its grid required to drive the output tube to its fullest extent is not sufficient to load the preceding tube $T_1$ to the same relative extent. Therefore, the relative distortion in the preceding tube is less than that which arises in the output tube and complete compensation does not occur. It is known, however, that the relative distortion arising in a tube having a resistance in its plate circuit is less the larger the ratio of the external resistance to the tube resistance.

Therefore, in accordance with the invention the desired compensation of distortion is secured by decreasing the ratio of $R_a$ to $R_i$ until the percentage distortion arising in tube $T_1$ becomes great enough to compensate the distortion arising in tube $T_2$. If the two tubes are of such size relatively that they are both relatively equally loaded compensation is secured by making $$\frac{R_a}{R_i} = \frac{\bar{R}_a}{\bar{R}_i}.$$

If as mentioned above $T_1$ is chosen to be less loaded relatively than $T_2$ then it is necessary to make $$\frac{R_a}{R_i} \text{ less than } \frac{\bar{R}_a}{\bar{R}_i}$$

The actual value of $R_a$ required in a particular case will have to be determined by trial or calculation involving the particular constants of the tubes used.

What I claim is:

In an amplifier arrangement comprising at least two electronic tubes arranged in cascade, a load resistance coupled to the output of the second tube, said load resistance being substantially equal to the internal resistance of the second tube, a resistor means for coupling the output of the first tube of said arrangement to the input of the second tube, said first tube being energized sufficiently to swing the output current of the second tube from zero to a value causing the tube to assume a saturated condition, said resistor means being of such value with respect to the internal resistance of the first tube that the ratio of the resistance of said resistor means to the internal resistance of the first tube is less than the ratio of the load resistance to the internal resistance of the second tube whereby the first tube impresses upon the input of the second tube a voltage of twice the signal frequency and of such phase as to create through the amplifying action of the second tube a distorted current of opposite phase to distortions arising in the second tube due to said saturation effects.

RICHARD FELDTKELLER.